United States Patent [19]

Sood et al.

[11] Patent Number: 4,869,892
[45] Date of Patent: Sep. 26, 1989

[54] METHODS OF MAKING FINE PARTICULATE ALUMINUM NITRIDE

[75] Inventors: Raman R. Sood; Frederick W. Southam; Narasimha S. Raghavan, all of Kingston, Canada

[73] Assignee: Alcan International Limited, Montreal, Canada

[21] Appl. No.: 95,916

[22] Filed: Sep. 11, 1987

[51] Int. Cl.$^4$ .............................................. C01B 21/06
[52] U.S. Cl. ................................................... 423/412
[58] Field of Search ....................................... 423/412

[56] References Cited

U.S. PATENT DOCUMENTS

| | | | |
|---|---|---|---|
| 3,216,820 | 11/1965 | Phillips et al. | 423/495 |
| 3,352,637 | 11/1967 | Heymer et al. | 423/412 |
| 3,477,812 | 11/1969 | Huml et al. | 423/412 |
| 3,607,014 | 9/1971 | Huml et al. | 423/495 |
| 3,979,500 | 9/1976 | Sheppard et al. | 423/412 |

FOREIGN PATENT DOCUMENTS

| | | | |
|---|---|---|---|
| 0087798 | 9/1983 | European Pat. Off. | |
| 0186144 | 7/1986 | European Pat. Off. | 423/412 |
| 1566055 | 5/1969 | France | |
| 126697 | 10/1979 | Japan | 423/412 |
| 91019 | 5/1983 | Japan | 423/412 |
| 91008 | 5/1986 | Japan | 423/412 |
| 201608 | 9/1986 | Japan | 423/412 |
| 1199811 | 7/1970 | United Kingdom | |
| 1221669 | 2/1971 | United Kingdom | 423/412 |

OTHER PUBLICATIONS

Chemical Abstracts, vol. 105, No. 26 (Dec. 1986), Abstract No. 229306p.

Primary Examiner—John Doll
Assistant Examiner—Wayne A. Lange
Attorney, Agent, or Firm—Cooper & Dunham

[57] ABSTRACT

A method of making fine particulate aluminum nitride, including the steps of reacting gaseous aluminum trichloride with aluminum-containing metallic material at elevated temperature to convert some of the trichloride to monochloride gas; introducing a gaseous nitrogen source to the monochloride-containing gas for reacting nitrogen with the monochloride to form fine particulate aluminum nitride; conducting a flow of gas comprising aluminum trichloride having the particulate nitride entrained therein to a cooling locality; there condensing the trichloride and accumulating the condensed trichloride and particulate nitride; and periodically reevaporating and removing the trichloride from the cooling locality for separating out and recovering the accumulated nitride.

16 Claims, 3 Drawing Sheets

METHODS OF MAKING FINE PARTICULATE ALUMINUM NITRIDE

BACKGROUND OF THE INVENTION

This invention relates to methods of making aluminum nitride in fine particulate form. In an important specific sense, the invention is directed to methods of making aluminum nitride of very high purity and submicron particle size.

One illustrative field of use for aluminum nitride made by the present methods is in the production of aluminum nitride substrates for chips for electronic applications, e.g. thyristors, diodes, very large scale integration (VLSI) chips, etc., employed in equipment such as computers. At present, such chips predominantly utilize alumina substrates, but the low thermal conductivity of alumina gives rise to problems of overheating in chips that have a high packing density of active devices or otherwise tend to generate relatively large amounts of heat in operation. Beryllia (BeO), proposed as an alternative chip substrate material, has a thermal conductivity about 7 to 8 times that of alumina, but presents other problems owing to its adverse thermal expansion properties, poor adhesion to silicon, toxicity, high cost and low availability.

Aluminum nitride possesses properties potentially favorable for chip substrate use, having a high electrical resistivity, a thermal conductivity as much as 7 to 10 times that of alumina, and a low thermal expansion coefficient. Very advantageously, up to a temperature of about 200° C. its thermal expansion coefficient is in close agreement with that of silicon. Currently commercially available aluminum nitride, however, is too low in purity for use in chip substrates; one difficulty with low-purity material arises from the fact that the thermal conductivity of aluminum nitride is directly related to material purity. Also, aluminum nitride bodies suitable for substrate use are made by sintering very fine particulate aluminum nitride, and known procedures do not enable convenient and economical attainment of material of adequate purity and suitably fine particle size for this purpose.

By way of illustration, a conventional process for aluminum nitride manufacture is the carbothermic reduction of alumina followed by nitridation. The product is aluminum nitride of approximately 98.5–99.0% purity, the remaining 1–1.5% being unreacted alumina and carbon. This and other known processes require high purity starting materials, and their products must be crushed and ground in order to achieve aluminum nitride of sufficiently fine particle size for sintering to form chip substrates. The necessity of crushing and grinding adds to processing costs, and results in contamination of the ground particulate nitride with foreign matter such as grinding media.

It is reported that submicron high purity AlN has been made in a plasma reactor by direct reaction of Al vapor and nitrogen gas at a temperature of about 7000° K. However, the process is very expensive, has a low efficiency, is associated with technical problems and has never been commercialized.

A similar product is also reported as having been made by direct reduction of $AlCl_3$ with gaseous ammonia at a temperature within the range 500°–1200° C. The reaction is endothermic and therefore energy-expensive. It is difficult to obtain $AlCl_3$ of the requisite high purity, and that used in the reaction is totally consumed and not available for recycling. The process is uneconomical and, as far as the present applicants are aware, has never been used commercially.

U.S. Pat. Nos. 3,477,812 and 3,607,014 describe a procedure for producing aluminum nitride single crystals by contacting a gaseous monovalent aluminum halide such as aluminum monochloride (i.e., AlCl) with a gaseous nitriding agent such as $N_2$ while providing an inert surface on which the crystals can form. In an example given in these patents, the AlCl is formed by reaction of $Al_4C_3$, $CaCl_2$ and C and is reacted with $N_2$ at a temperature of about 1700° C. to produce $AlCl_3$ gas and AlN crystals; the crystals are said to range generally in diameter from about 1 to about 15 microns and generally to have a length-to-diameter ratio of about 500 to about 2500. These relatively large crystals would not be sinterable to produce chip substrates.

SUMMARY OF THE INVENTION

The present invention broadly contemplates the provision of a method of making aluminum nitride comprising the steps of introducing, at a first locality, to an atmosphere comprising gaseous aluminum trichloride and aluminum monochloride at elevated temperature, a gaseous source of nitrogen for reaction with the monochloride to produce aluminum nitride, under conditions such that the aluminum nitride forms in the first locality as a fine particulate solid; conducting a flow of gas comprising aluminum trichloride having the particulate aluminum nitride entrained therein from the first locality to a second locality; and, at the second locality, separating out and recovering the transported aluminum nitride in maintained fine particulate solid form.

In accordance with particular features of the invention, in one important aspect, this method more specifically comprises the steps of bringing a flow of gaseous aluminum trichloride into contact with aluminum-containing metallic material at elevated temperature for reacting some of the trichloride with aluminum of the metallic material to form aluminum monochloride and thereby to establish in the gas flow, at a first locality downstream of the metallic material, a gaseous mixture comprising aluminum monochloride and unreacted aluminum trichloride; introducing a gaseous source of nitrogen (e.g., $N_2$ or $NH_3$) to the gas flow at that first locality for reaction of the nitrogen with the monochloride to form aluminum nitride in fine particulate state, entrained in the gas flow; conducting the gas flow, now comprising aluminum trichloride having the particulate aluminum nitride entrained therein, from the first locality to a second locality; and at the second locality, separating out and recovering the particulate aluminum nitride from the aluminum trichloride of the flow. This method, which can advantageously use low-purity (and hence low-cost) starting material for the metallic material, provides an aluminum nitride product of submicron (i.e., less than one micron) particle size and high purity (a purity greater than 99.8% being expected to be attainable), suitable for immediate sintering to form chip substrates without any preliminary crushing, grinding or other processing.

In a second specific aspect, the method of the invention comprises establishing, at a first locality, a flow of gas comprising gaseous aluminum monochloride, gaseous aluminum trichloride and a gaseous source of nitrogen under conditions for effecting reaction of the nitrogen with the monochloride to form aluminum nitride in fine particulate state entrained in the flow; conducting the flow of gas, now comprising aluminum trichloride having the fine particulate aluminum nitride entrained therein, from the first locality to a second locality; at the second locality, condensing the aluminum trichloride of the flow for accumulating condensed aluminum trichloride and the fine particulate aluminum nitride at the second locality; periodically reevaporating the condensed aluminum trichloride and conducting the reevaporated trichloride from the second locality, leaving the accumulated fine particulate aluminum nitride at the second locality for recovery. The specific separation procedure incorporated in this aspect of the invention affords advantages in facilitating recovery of the high-purity fine particulate product.

Beneficially, in preferred embodiments of the method of the invention, the latter separation procedure is combined with the specific monochloride gas-forming procedure utilized in the first-mentioned aspect of the invention.

Additionally, the invention contemplates the provision of a submicron-size particulate aluminum nitride produced by the foregoing method.

Further features and advantages of the invention will be apparent from the detailed description hereinbelow set forth, together with the accompanying drawings.

DETAILED DESCRIPTION

The method of the invention will be described, with reference to FIG. 1, in an embodiment wherein aluminum monochloride (AlCl) is formed by a procedure heretofore known for use in the so-called subhalide distillation of aluminum, such procedure being disclosed, for example, in U.S. Pat. Nos. 2,470,305 and 3,234,013. Stated broadly, the subhalide distillation of aluminum broadly involves bringing a gas-permeable mass of impure aluminum-containing metallic material into contact with a flow of gaseous aluminum trihalide (e.g., aluminum trichloride, AlCl$_3$) in a reactor vessel or "converter" while maintaining the metallic material at an elevated temperature sufficient to sustain the endothermic reaction

thereby to provide a flow of heated gas, from the converter, comprising AlCl in mixture with substantial quantities of unreacted AlCl$_3$. At a location downstream of the converter, the gas is reduced in temperature to cause the monochloride to decompose (i.e., reversing the above reaction) into AlCl$_3$ and product aluminum metal. Details of process conditions for performing these steps are set forth, for example, in the two last-cited patents.

The present invention, as stated, in the embodiment now to be described, utilizes a monochloride-forming procedure generally as heretofore employed in the subhalide distillation process; however, the monochloride, instead of being decomposed to recover aluminum metal, is reacted with a gaseous nitriding agent (preferably N$_2$, although other agents such as NH$_3$ may alternatively be used to form submicron-size particles of aluminum nitride. These particles are entrained in the gas flow and subsequently recovered in the manner explained below.

Figure 1:
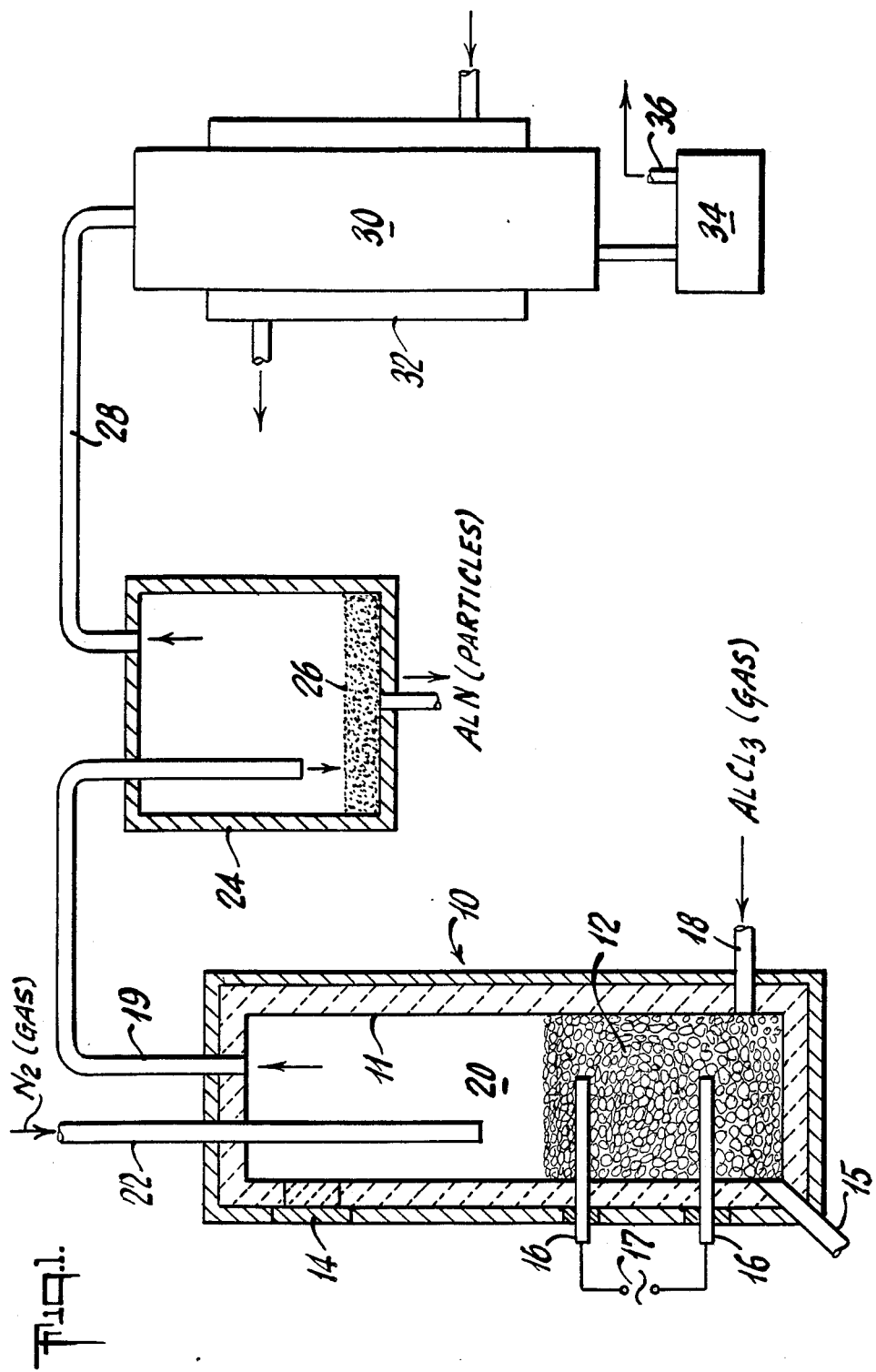
FIG. 1 is a highly simplified schematic and partly diagrammatic view of a system arranged for the practice of the method of the invention in an illustrative embodiment.

Referring to FIG. 1, the system there shown includes a reactor 10 generally similar to a so-called subhalide converter of known character (as described in the two last-cited patents), e.g. having an elongate, upright refractory-lined internal heating chamber 11 adapted to contain a mass 12 of impure aluminum-bearing metallic material in lump or granular form. The material is introduced to the chamber through an inlet 14 opening at the top of the reactor, and is withdrawn from the chamber (after treatment therein to effect removal of aluminum) through an outlet at the lower end of the reactor, represented as a conduit 15. The reactor also includes means for passing an electric current through the mass of material in the chamber to effect electrical resistance heating of the material; such means are illustrated as a pair of vertically spaced electrodes 16 which may be of annular or other configuration arranged for contact with the material in the chamber, and which are connected to a suitable power source 17. A gas inlet conduit 18 opening at a lower region of the reactor chamber and a gas outlet conduit 19 arranged for withdrawal of gas from an upper locality in the chamber are also provided. It will be appreciated that the foregoing structures are herein shown and described in highly simplified form and by way of illustration only, to exemplify one type of reactor with which the present invention may be associated.

In the operation of such a reactor, the internal reactor chamber is substantially filled with the lumps and granules of impure material to be treated, an example of such material being the crude carbothermic alloy, containing approximately 50% by weight of aluminum, produced by the direct reduction of bauxite. This material in the chamber is maintained, as by the aforementioned electrical resistance heating, at a temperature e.g. in the range of about 1000° C. and upwards. Heated aluminum trichloride gas, e.g vaporized anhydrous AlCl$_3$, introduced to the chamber as or in a flow of gas through the conduit 18, passes upwardly through the chamber, permeating the interstices of the heated mass of crude alloy. Under the conditions of elevated temperature maintained in the chamber, this trichloride gas reacts with aluminum in the alloy to form aluminum monochloride gas. From time to time unreacted alloy is added to the chamber through the inlet 14, while spent alloy (substantially exhausted of aluminum) is periodically discharged from the lower end of the chamber through the outlet conduit 15 as a waste residue, to accommodate the fresh increments of unreacted alloy added at the upper end of the chamber.

In this way there is established and maintained, in the region of the reactor chamber above the alloy mass 12, a heated atmosphere comprising the monochloride gas produced in the reactor, together with unreacted trichloride gas. The monochloride-trichloride gas mixture is at a temperature approximating the reaction temperature maintained by the heating means 16, viz. a temperature in the range of about 1000° C. and upwards. More particularly, an illustrative suitable value for the reaction temperature in the method of the invention is about 1575° Kelvin (about 1300° C.).

Further in accordance with the invention, a flow of the nitriding gas (here shown as N₂) is introduced to the described monochloride-trichloride gas mixture at a locality 20 within the reactor chamber through a conduit 22 that extends downwardly into the reaction chamber. Nitrogen of this gas reacts exothermically with the monochloride to form very fine (submicron-size) solid particles of aluminum nitride (AlN) which are entrained in the upwardly flowing gas within the chamber. Nitrogen in excess of the stoichiometric requirements of the reaction is necessary in order to ensure complete consumption of the aluminum monochloride. The above-described reactions occurring within the chamber may be represented as follows:

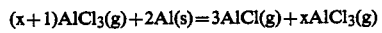

$$(x+1)AlCl_3(g) + 2Al(s) = 3AlCl(g) + xAlCl_3(g)$$

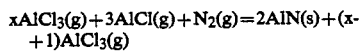

$$xAlCl_3(g) + 3AlCl(g) + N_2(g) = 2AlN(s) + (x+1)AlCl_3(g)$$

where (g) and (s) respectively indicate gaseous and solid states.

The trichloride gas is introduced to the reactor chamber in such manner as to establish and maintain an upward flow of gas through the chamber. Thus, a gas flow, comprising unreacted and reconstituted aluminum trichloride and entrained particulate solid aluminum nitride, flows upwardly from the nitriding locality 20 through the gas outlet conduit 19 at the top of the chamber. This gas flow will also contain unreacted N₂ because excess N₂ is supplied through conduit 22 or, if NH₃ is used as the nitriding gas, it may contain H₂; moreover, an inert gas (e.g. argon) may be included in the inlet trichloride flow to the reactor, and in such case the inert gas will also be present in the outlet flow.

In the system shown, the conduit 19 conveys the outlet gas flow of aluminum trichloride and entrained particulate aluminum nitride (with one or more additional gaseous components as mentioned above) from the reactor to a downstream cooling chamber 24 which is maintained substantially at room temperature. Owing to the cool temperature of this chamber, the trichloride of the gas flow condenses therein, as indicated at 26, and the entrained aluminum nitride particles settle and collect in the condensed trichloride. Preferably two or more such chambers (only one being shown in FIG. 1) are provided, being connected to the reactor outlet in parallel and used alternately. When one chamber is cooled to condense the reaction products the other is gently heated (e.g. by suitable external means, not shown) sufficiently to reevaporate the condensed accumulated trichloride, and this reevaporated trichloride is conducted from the cooling chamber as a gas through a further conduit 28 to a condenser vessel 30, cooled by a water jacket 32, for condensation and collection in a receptacle 34; fumes, N₂ and/or other gaseous components may be discharged from the latter receptacle through exhaust 36, while the collected AlCl₃ is recycled in any convenient manner for reuse in the inlet gas flow to the reactor 10.

When the aluminum trichloride is reevaporated from the cooling chamber 24 as just described, the accumulated particulate AlN remains in the cooling chamber and is removed therefrom and recovered as the product of the method. In the illustrated system, the nitride is continuously kept from exposure to air from its initial formation in locality 20 through its collection as product in chamber 24. This product is a submicron-sized particulate AlN (illustratively less than 0.2 micron in particle size, as determined in tests of the present method) having a purity expected to be greater than 99.8%, and is fully suitable, with respect both to purity and to particle size, for immediate use to produce sintered chip substrates or for other purposes requiring very fine, high-purity AlN.

Figure 2:
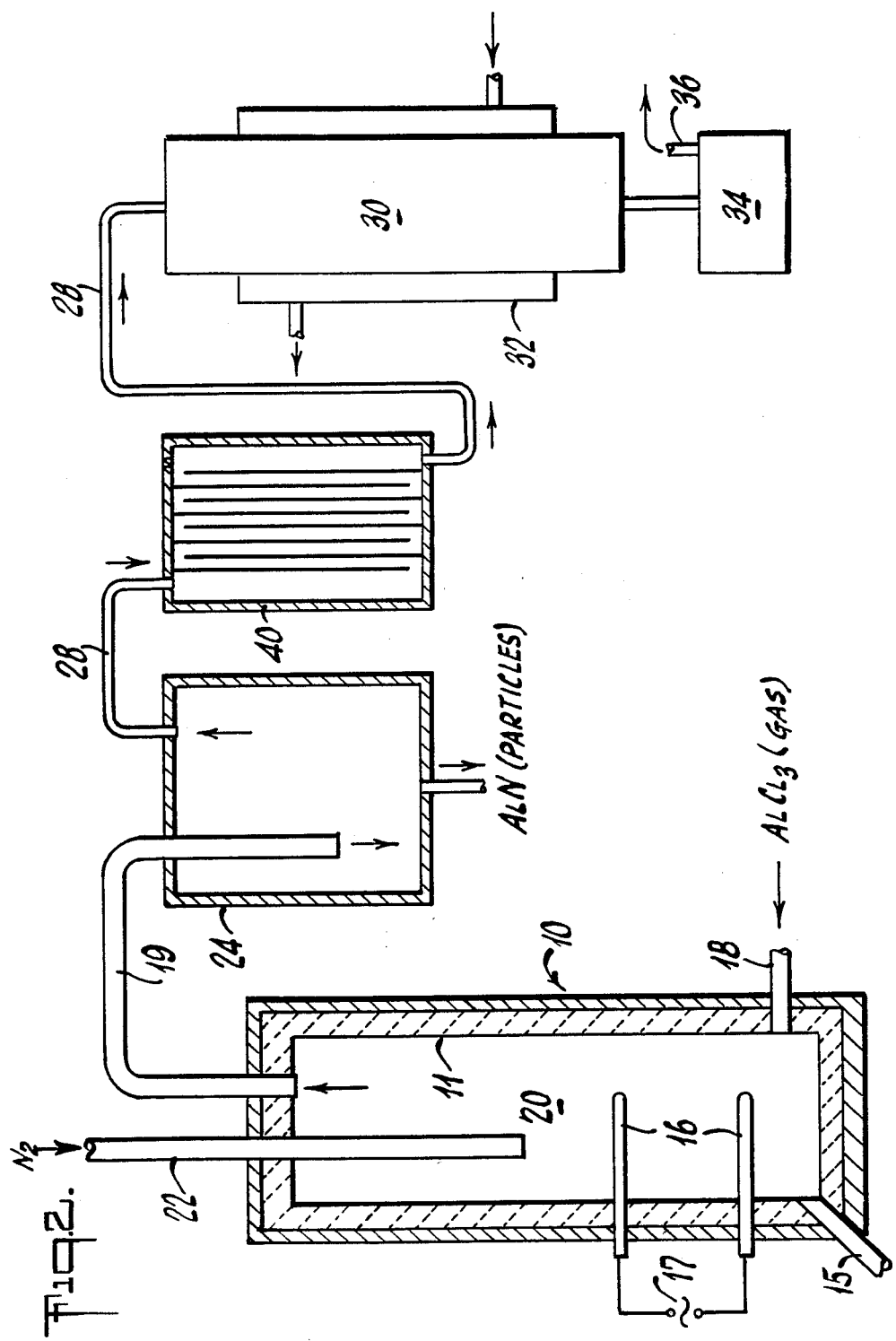
FIG. 2 is a similar view of another system arranged for the practice of a modified embodiment of the present method.

Electrostatic precipitators may be used for the collection of the fine AlN particles, either in place of or together with the chamber 24. If used alone for that purpose, an electrostatic precipitator will need to be operated at a temperature above 200° C. in order to avoid collecting any unreacted (byproduct) AlCl₃ along with the product AlN. Alternatively, as shown in FIG. 2, an electrostatic precipitator 40 may be used in conjunction with the particle collecting arrangement of the FIG. 1 system (collection of the fine AlN along with the unreacted AlCl₃ in the wall-cooled chamber 24 followed by re-evaporation of the AlCl₃), all other elements of the FIG. 2 system being the same as (and identified with the same reference numerals as) the corresponding elements of the FIG. 1 system. The electrostatic precipitator 40 is connected in the outlet conduit 28 of the particle collection chamber 24 and operated at a temperature of 200°–300° C., for collecting (in precipitator 40) those AlN particles that are not trapped in chamber 24 but are carried over into conduit 28.

As an alternative to the chlorination (with AlCl₃) of a mass of crude alloy 12 in the converter 10 of the systems illustrated in the drawings, it is possible to chlorinate molten aluminum metal with AlCl₃ to form AlCl for further reaction with a nitriding gas to make AlN. In this case, the AlCl is produced in a separate first reactor (by contact of molten Al with AlCl₃ gas therein at a temperature of, e.g., about 1000 to about 1400° C.) and then led to a second reactor (as a flow of AlCl/AlCl₃ gas mixture) for the nitridation reaction. Suitable equipment, procedures and conditions for such chlorination of molten Al to produce AlCl are described in United Kingdom Patent No. 943,589.

Figure 3:
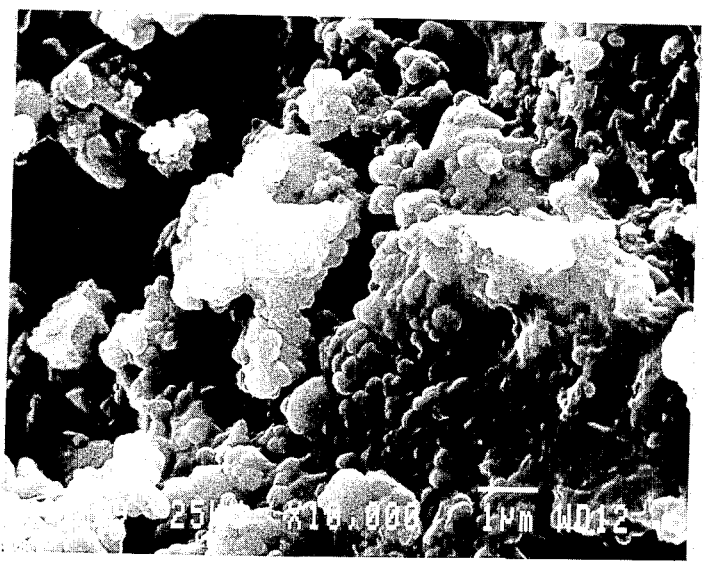
FIG. 3 is a scanning electron micrograph which shows the product of the invention at a magnification of 10,000 on which a one-micron bar is superimposed.

The photomicrograph of FIG. 3 shows clearly that the particles comprising the product of the invention are significantly finer than one micron.

It is at present believed that the very fine particle size of the AlN produced by the method of the invention is attributable to the temperature conditions obtaining in and beyond the locality at which it is initially formed. In particular, while the reaction of nitriding agent with monochloride is highly exothermic, it is believed that the presence of a relatively large proportion of unreacted trichloride gas at that locality (characteristic of converter operation in the aforementioned subhalide distillation process) may function as a diluent to moderate the nitriding reaction, so that the temperature at which nitriding occurs remains, say, at about 1200° C. It is known that solids produced by gas phase reactions are inherently fine and that growth results from subsequent heating; hence the maintenance of such relatively low temperature at and beyond the nitriding locality will tend to preserve the initial very fine particle size.

An important advantage of the invention, in combination with the fineness of particle size (and consequent avoidance of product crushing and/or grinding) is the high purity achieved, yet in an economical manner, with starting solid material (crude aluminum-containing alloy) that may be very impure. This result is due in the first instance to the fact that the monochloride-producing reaction employed is highly selective to aluminum. The separation and recovery steps used also contribute to preservation of product purity, as well as to ease of operation and handling. If the product particulate nitride were exposed to atmospheric oxygen at the collection stage, oxidation would occur; if it were exposed to water, ammonia would be generated, in each instance with undesirable consequences. In some instances, however, the advantages of the invention may be realized (at least in substantial measure) with alternative separation and recovery procedures.

Also, while the "subhalide distillation" type of monochloride-producing procedure utilizing crude alloy or the like is economically satisfactory for large-producing procedures may be employed provided that conditions are such as to produce a very fine particulate AlN product.

Stated more generally, the invention contemplates reacting a gaseous nitriding agent with aluminum monochloride of a gaseous mixture comprising aluminum trichloride and aluminum monochloride at a first locality under conditions for producing aluminum nitride in fine particulate solid form, entraining the produced particulate nitride in a flow of gas comprising aluminum trichloride, which flow is conducted from the first locality to a second locality, and at the second locality, separating out and recovering the produced nitride in maintained fine particulate form. Conditions for production of the fine particulate at the first locality include maintenance of the temperature therein at a sufficiently low value, e.g. 1200°–1300° C., to preclude growth of larger particles; this feature is exemplified, in the specific embodiment illustrated in the drawing, by the provision at the first locality 20 of a trichloride-monochloride gas mixture at such temperature whereby, as at present believed, the exothermic nitriding reaction is moderated by the diluent effect of the trichloride. Avoidance of deposit and growth of the nitride on surfaces at the first locality is achieved by the entrainment of the formed nitride particles in the departing gas flow, which occurs as a result of the provision of appropriate gas flow conditions.

By way of further illustration, reference may be made to the following specific examples of experimental practice of the method of the invention. Each of these examples employed a bed of crude alloy having a composition within the following range:

| | % by weight |
|---|---|
| Al | 55 ± 3 |
| C | 4 to 6 |
| Fe | 29 to 31 |
| Si | 5 to 6 |
| Ti | 4 to 5 |

In all the examples, the crude alloy bed was maintained at a temperature of 1300° C. during the run, and was chlorinated with $AlCl_3$ reactant gas.

EXAMPLE 1

A bed of the crude alloy was chlorinated as described above and the resultant AlCl-containing gas was nitrided with $N_2$ gas at a flow rate of 10 l/m. The amount of $AlCl_3$ reactant gas fed to the crude alloy was 135 g. The length of the run was 2 hours 30 minutes.

AlN particles were collected along with unconverted $AlCl_3$ reactant and reaction byproduct $AlCl_3$ in a chamber kept at ambient temperature. The AlN was recovered by sublimation of the condensed $AlCl_3$ at a maximum temperature of 250° C., leaving behind the AlN particles in the collection chamber. Identification of the product as AlN was determined by Fourier transform infrared (FTIR) analysis.

EXAMPLE 2

A bed of the crude alloy was chlorinated and nitrided under the same conditions as in Example 1 except that the amount of $AlCl_3$ reactant gas fed to the bed was 85 g. AlN particles together with unconverted $AlCl_3$ and reaction byproduct $AlCl_3$ were collected in an alumina crucible contained in an unheated/uncooled collection chamber. The AlN particles were recovered by sublimation of the condensed $AlCl_3$ at a maximum temperature of 175° C., leaving behind the AlN particles. Identification of the product as AlN was performed by x-ray diffraction analysis of the heat-treated product particle.

EXAMPLE 3

In this experiment, the chlorination - nitridation conditions of Examples 1 and 2 were altered as follows: $N_2$ flow rate, 5 l/m; amount of $AlCl_3$ reactant fed, 35 g.; run length, 2 hours 15 minutes. The AlN particles produced were collected along with $AlCl_3$ (unconverted reactant and reaction byproduct) in a chamber provided with a baffle and surrounded by a dry ice bath. To recover the AlN product particles, the condensed $AlCl_3$ was sublimated at temperatures up to 300° C., leaving the AlN particles behind in the collection chamber. The product was identified as AlN by FTIR analysis.

EXAMPLE 4

The procedures of the preceding examples were further modified by using $NH_3$ as the nitriding gas, at a flow rate of 5 l/m; the amount of $AlCl_3$ reactant fed to the bed was 15 g., and the run length was 1 hour 20 minutes. Produced AlN particles together with byproduct $NH_4Cl$ and excess unreacted $AlCl_3$ were collected in a chamber provided with a baffle and surrounded by a dry ice bath. The AlN particles were recovered by sublimating the condensed $NH_4Cl$ and $AlCl_3$ at a temperature of 350° C., leaving behind the AlN particles in the collection chamber. FTIR analysis was employed to identify the product as AlN.

It is to be understood that the invention is not limited to the features and embodiments hereinabove specifically set forth, but may be carried out in other ways without departure from its spirit.

We claim:

1. A method of making aluminum nitride comprising
    (a) at a first locality, introducing a gaseous nitriding agent to a gaseous mixture comprising aluminum trichloride and aluminum monochloride under conditions for effecting reaction of the nitriding agent with the monochloride to produce aluminum nitride in fine particulate solid form;
    (b) conducting a flow of gas, comprising aluminum trichloride having the produced particulate nitride entrained therein, from said first locality to a second locality; and
    (c) at said second locality, separating out and recovering the nitride in maintained fine particulate form;
    (d) said fine particulate form comprising submicron-size particles.

2. A method according to claim 1, including the step of establishing said gaseous mixture by reacting gaseous aluminum trichloride with a bed of crude aluminum-containing alloy at elevated temperature.

3. A method according to claim 1, including the step of establishing said gaseous mixture by chlorinating molten aluminum metal with gaseous aluminum trichloride at a locality ahead of and separate from said first locality.

4. A method according to claim 1, wherein step (a) is performed at a temperature of not more than 1300° C.

5. A method of making fine particulate aluminum nitride, comprising
(a) bringing a flow of gaseous aluminum trichloride into contact with aluminum-containing metallic material at elevated temperature for reacting some of the trichloride with aluminum of the metallic material to form aluminum monochloride and thereby to establish in said flow, at a first locality downstream of the metallic material, a gaseous mixture comprising aluminum monochloride and aluminum trichloride;
(b) introducing a gaseous source of nitrogen to said flow at said first locality for reaction of the nitrogen with the monochloride to form aluminum nitride in fine particulate state, entrained in the flow;
(c) conducting the flow of gas, now comprising aluminum trichloride having said particulate aluminum nitride entrained therein, from said first locality to a second locality; and
(d) at said second locality, separating out and recovering said particulate aluminum nitride from the aluminum trichloride of the flow;
(e) said particulate aluminum nitride having a particle size of less than one micron.

6. A method according to claim 5, wherein said gaseous source of nitrogen is $N_2$.

7. A method according to claim 5, wherein said gaseous source of nitrogen is ammonia.

8. A method according to claim 5, wherein the step of separating out and recovering aluminum nitride comprises, at said second locality, cooling said flow of gas for condensing the aluminum trichloride such that condensed aluminum trichloride and said particulate aluminum nitride accumulate at said second locality; reevaporating the condensed trichloride at the second locality; and conducting the reevaporated trichloride from the second locality, leaving accumulated particulate aluminum nitride at the second locality for recovery therefrom.

9. A method according to claim 8, further including the step of conducting the reevaporated trichloride to a third locality and recovering the reevaporated trichloride at said third locality by recondensation.

10. A method according to claim 8, wherein step (c) is performed by alternately conducting the flow of gas to one or another of two chambers each alternately constituting said second locality, condensing the trichloride in the chamber to which the gas flow is conducted for collection of condensed trichloride and aluminum nitride particles therein; and wherein step (d) is performed by reevaporating condensed trichloride in, and conducting the reevaporated trichloride from, the last-mentioned chamber after redirecting the gas flow from the last-mentioned chamber to the other of the two chambers.

11. A method according to claim 8, further including the step of passing the reevaporated trichloride as a gas flow through an electrostatic precipitator for selectively collecting therein any aluminum nitride particles entrained in the reevaporated trichloride.

12. A method according to claim 5, wherein step (d) includes conducting the gas flow through an electrostatic precipitator for selectively collecting therein the aluminum nitride particles entrained in the gas flow.

13. A method of making fine particulate aluminum nitride, comprising:
(a) at a first locality, establishing a flow of gas comprising gaseous aluminum monochloride, gaseous aluminum trichloride and a gaseous source of nitrogen under conditions for effecting reaction of the nitrogen with the monochloride to form aluminum nitride in fine particulate state entrained in the flow;
(b) conducting the flow of gas, now comprising aluminum trichloride having the fine particulate aluminum nitride entrained therein, from said first locality to a second locality;
(c) at said second locality, condensing the aluminum trichloride of the flow for accumulating condensed aluminum trichloride and said fine particulate aluminum nitride at said second locality;
(d) periodically reevaporating the condensed aluminum trichloride and conducting the reevaporated trichloride from said second locality, leaving the accumulated fine particulate aluminum nitride at said second locality for recovery therefrom;
(e) said fine particulate aluminum nitride having a particle size of less than one micron.

14. A method according to claim 13, further including the step of conducting the reevaporated trichloride to a third locality and recovering the reevaporated trichloride at said third locality by recondensation.

15. A method according to claim 13, wherein step (c) is performed by alternately conducting the flow of gas to one another of two chambers each alternately constituting said second locality, condensing the trichloride in the chamber to which the gas flow is conducted for collection of condensed trichloride and aluminum nitride particles therein; and wherein step (d) is preformed by reevaporating condensed trichloride in, and conducting the reevaporated trichloride from, the last-mentioned chamber after redirecting the gas flow from the last-mentioned chamber to the other of the two chambers.

16. A method according to claim 13, further including the step of passing the reevaporated trichloride as a gas flow through an electrostatic precipitator for selectively collecting therein any aluminum nitride particles entrained in the reevaporated trichloride.

* * * * *